United States Patent
Boucher et al.

(10) Patent No.: US 7,093,757 B2
(45) Date of Patent: Aug. 22, 2006

(54) BAR CODE READER STAND

(75) Inventors: Christiane Boucher, Verdun (CA); Roger Garceau, Pierrefonds (CA); Alain Grondines, Rosemère (CA)

(73) Assignee: Societe des Loteries Video du Quebec, Inc., Montreal (CA)

( * ) Notice: Subject to any disclaimer, the term of this patent is extended or adjusted under 35 U.S.C. 154(b) by 95 days.

(21) Appl. No.: 10/744,463

(22) Filed: Dec. 22, 2003

(65) Prior Publication Data

US 2004/0149829 A1  Aug. 5, 2004

Related U.S. Application Data

(60) Provisional application No. 60/437,449, filed on Jan. 2, 2003.

(51) Int. Cl.
*G06K 7/10* (2006.01)

(52) U.S. Cl. .............................. 235/462.01; 235/462.14

(58) Field of Classification Search ............ 235/462.1, 235/462.13, 462.45, 472.01
See application file for complete search history.

(56) References Cited

U.S. PATENT DOCUMENTS

| | | | | |
|---|---|---|---|---|
| 4,672,184 A | | 6/1987 | Fujiwara et al. ............ 235/462 |
| 4,766,297 A | * | 8/1988 | McMillan ............... 235/462.07 |
| 4,939,356 A | | 7/1990 | Rando et al. ................ 235/467 |
| 5,237,161 A | * | 8/1993 | Grodevant ............. 235/462.31 |
| 5,430,283 A | * | 7/1995 | Tanaka .................... 235/462.2 |
| 5,665,955 A | | 9/1997 | Collins, Jr. et al. ......... 235/462 |
| 5,756,981 A | | 5/1998 | Roustaei et al. ............ 235/462 |
| 5,834,751 A | | 11/1998 | Jager et al. .................. 235/462 |
| 5,883,373 A | | 3/1999 | Swartz ....................... 235/462 |
| 5,992,747 A | | 11/1999 | Katoh et al. ............ 235/462.43 |
| 6,216,953 B1 | * | 4/2001 | Kumagai et al. ...... 235/472.01 |
| 6,540,143 B1 | * | 4/2003 | Matsumori ............ 235/462.13 |
| 6,585,159 B1 | * | 7/2003 | Meier et al. ........... 235/462.31 |

* cited by examiner

*Primary Examiner*—Daniel Stcyr
(74) *Attorney, Agent, or Firm*—DLA Piper Rudnick Gray Cary US LLP (57) ABSTRACT

The present invention provides a bar code reader support stand that is portable and easy to set up in addition to being stable and not easily tipped. The support stand provides a reading surface on which to place a coded medium. The support stand further provides a securing area for mounting a bar code reader, such that said bar code reader is held at a predetermined and fixed distance and angle with respect to said reading surface. The fixed position and orientation of the bar code reader with respect to the reading surface allows for a consistently reliable reading of the coded medium. Installation and usage of the device can be more efficient since the user need not adjust the bar code reader orientation at the time of set-up, nor re-adjust it during the course of usage. The design of the weight-stabilised base allows the device to be set up and used in an active environment without the need to rigidly connect it to a table top by means of screws or bolts. The bar code reader stand according to the present invention may also include a protective structure for protecting the cable interconnected with the bar code reader. Said protective structure can provide protection for the cable itself as well as to the point of connection between said cable and the electronic device or bar code reader.

20 Claims, 7 Drawing Sheets

BAR CODE READER STAND

CROSS REFERENCE TO RELATED APPLICATION(S)

This application claims the benefit of priority under 35 U.S.C. § 119(e) of U.S. Ser. No. 60/437,449, filed Jan. 2, 2003, the entire content of which is incorporated herein by reference.

BACKGROUND OF THE INVENTION

1. Field of the Invention

The present invention pertains to the field of stands and more particularly to stands for bar code readers.

2. Background Information

The use of optical bar codes for identifying a wide variety of goods is well established, and such codes have proliferated with the increased use of automatic data processing systems. This has produced a strong demand for reliable systems which will rapidly and accurately read the information provided by the codes, and transfer that information to a computer, a data storage system, a read-out display, a control device or the like. Extremely fast and accurate reading of these codes is particularly necessary if the advantages of computer control are realised.

Numerous reading devices as well as a variety of mechanical systems have been developed for detecting bar codes and for providing corresponding electrical signals. One known system includes a light source for directing a focused light beam to illuminate and scan bar code labels along a line, and a deflector positioned in the light path to receive the reflected light from bar code labels and deflect it through a field lens positioned on the optic axis between the deflector and an optical sensor.

Bar code scanners are well known for their usefulness in retail checkout and inventory control. Bar code scanners generally employ a single laser source, the light from which is collimated and focused to produce a scanning beam. They may additionally employ a mirrored spinner to direct the beam against a plurality of stationary mirrors, and a detector to collect the beam after it is reflected by a bar code label. The pattern produced by such a scanner is characterised by lines oriented at various angles to one another.

Bar code scanners may be directly mounted to the top surface of the checkout counter in a vertical manner. Such scanners, however, such are typically specialised for uses such as retail check-out. Since the apparatus requires the bar code to be held in a vertical position, it is impractical for many applications. Furthermore, these bar code supporting structures are designed to be fixed to the top surface of a table or counter by means of screws or bolts. As such, they are impractical for use in temporary situations where quick installation is desirable and where the use of screws or bolts would cause undesirable permanent marring of table tops. A vertical design also exists for supporting a bar code reader wherein the bar code reader can also be used in a hand-held manner. However, using a hand held scanner for extended periods may lead to fatigue, and the positioning of a scanner by hand may not consistently provide quick accurate readings. Vertical holders for bar code readers are disclosed in U.S. Pat. No. 5,834,751, No. 5,665,955 and No. 5,992,747.

Bar code support stands also exist where the bar code reader is mounted on an adjustable arm. The arm can be contain joints and be spring-loaded. Alternatively, the arm can be a "semi-rigid" structure, capable of being bent into any desired shape. Such movable arms for supporting bar code readers have been disclosed in U.S. Pat. No. 4,672,184 and No. 5,883,373. Movable arms allow for greater flexibility in how the scanner is used and what coded materials it can use. However, to obtain optimal performance, the user may have to manually adjust the orientation of the bar code reader, that is to say the distance and angle of the reader, with respect to the material to be read. Such adjustment would likely be made using trial and error. The adjustment would need to be made each time the system is set up. Furthermore, in an active environment, it is likely that the orientation of the bar code reader would gradually deviate from its optimal orientation, either due to jostling or gravity. Periodic readjustments would then be necessary.

Therefore, it would be desirable to provide a reliable bar code reader stand that would enable a bar code reader to provide more reliable and accurate readings of bar codes in an efficient manner, and would require a minimal amount of effort to install and use.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a bar code reader stand. In accordance with an aspect of the present invention, there is provided a bar code reader stand comprising a base with a bottom surface and a top surface and a thickness, said base having a base securing area; an elongated member having a first and second end, the first end having a first securing area connected to said base at the base securing area, said elongated member extending away from said base and said second end having a second securing area; and a reading area including a substantially flat area on the top surface of the base; wherein a bar code reader is fastened to the elongated member at the second securing area thereby orienting said bar code reader with said reading surface for reading a coded medium.

DETAILED DESCRIPTION OF THE INVENTION

Definitions

The term "coded medium" is used to describe any object having associated therewith a bar code. This bar code provides a means for identifying the identity of the object. The object can be anything that is to be identified, for example a can of soup, car part, lottery ticket or any other item.

The term "reading surface" is used to describe an area where a coded medium is positioned to enable a bar code reader to scan a bar code associated with the coded medium.

Unless defined otherwise, all technical and scientific terms used herein have the same meaning as commonly understood by one of ordinary skill in the art to which this invention belongs.

The present invention provides a bar code reader support stand that is portable and easy to set up in addition to being stable and not easily tipped. The support stand provides a reading surface on which to place a coded medium. The support stand further provides a securing area for mounting a bar code reader, such that said bar code reader is held at a predetermined and fixed distance and angle with respect to said reading surface. The fixed position and orientation of the bar code reader with respect to the reading surface allows for a consistently reliable reading of the coded medium. Installation and usage of the device can be more efficient since the user need not adjust the bar code reader orientation at the time of set-up, nor re-adjust it during the course of usage. The design of the weight-stabilised base allows the device to be set up and used in an active environment without the need to rigidly connect it to a table top by means of screws or bolts. The bar code reader stand according to the present invention may also include a protective structure for protecting the cable interconnected with the bar code reader. Said protective structure can provide protection for the cable itself as well as to the point of connection between said cable and the electronic device or bar code reader.

The stand according to the present invention comprises a base and an elongated member extending therefrom. The base may be weighted in a manner that increases the stability of the stand and the base can also provide a reading surface upon which coded mediums are to be positioned. The elongated member has a first securing area on one end, which is fixed to the base, and a second securing area at the opposite end, positioned away from the base. The middle portion of the elongated member, which comprises the segment between the two securing areas, may be straight, arced or any other type of geometric design desired, while maintaining the desired strength. A bar code reader is attached to the second securing area of the elongated member, and held at a fixed distance from the reading surface, with the scanning end of the bar code reader being directed towards the reading surface at a fixed angle. Subsequent to the reading of the bar code, the reader transmits the collected information to a computer system, as is usual in bar code reading systems. In one embodiment of the invention, the bar code reader transmits the data to a notebook computer (not shown) which communicates with a wireless network. In another embodiment of the present invention, the bar code reader contains an embedded system capable of wireless communications.

Figure 1:
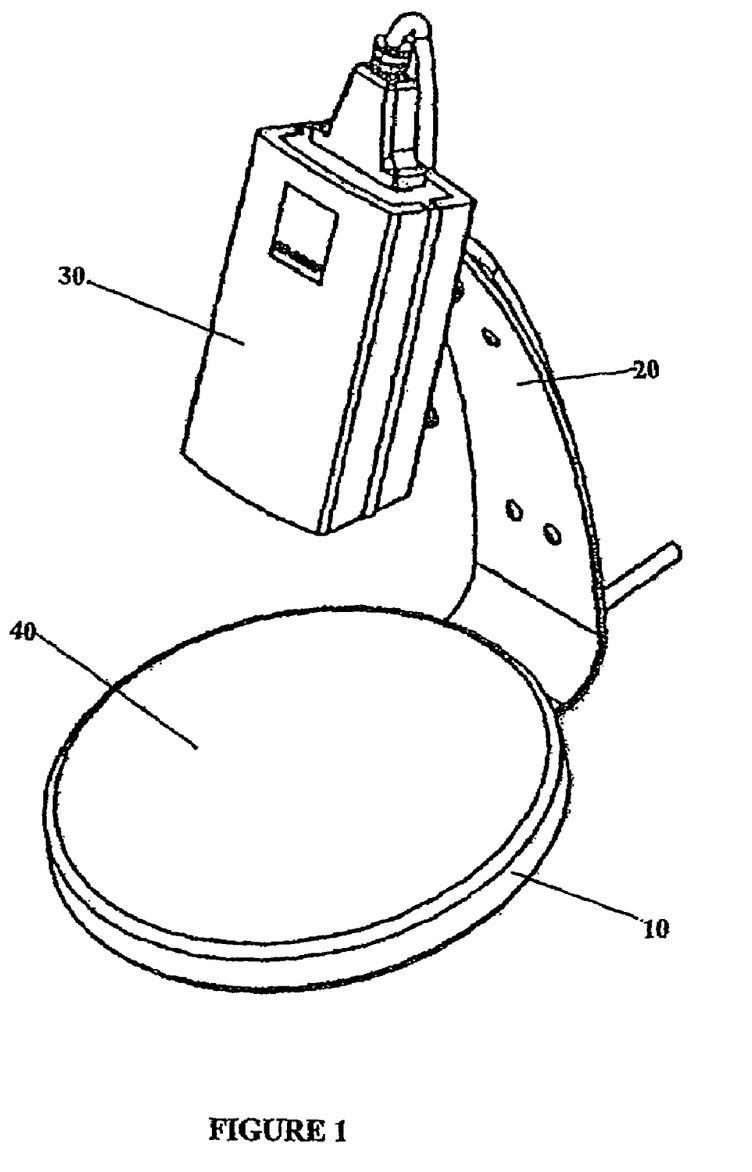
FIG. 1 is a perspective view of the stand with a bar code reader attached thereto, according to one embodiment of the present invention.

FIG. 1 illustrates a perspective view of the bar code reader stand according to one embodiment of the present invention.

The bar code reader stand includes a base 10 and an elongated member 20 extending from the base. A bar code reader 30 is attached to the elongated member 20. The reading surface 40 is a flat area on the top surface of the base 10. A coded medium may be positioned on the reading surface 40 enabling the bar code reader 30 to read the bar code on the coded medium.

Base

Figure 3:
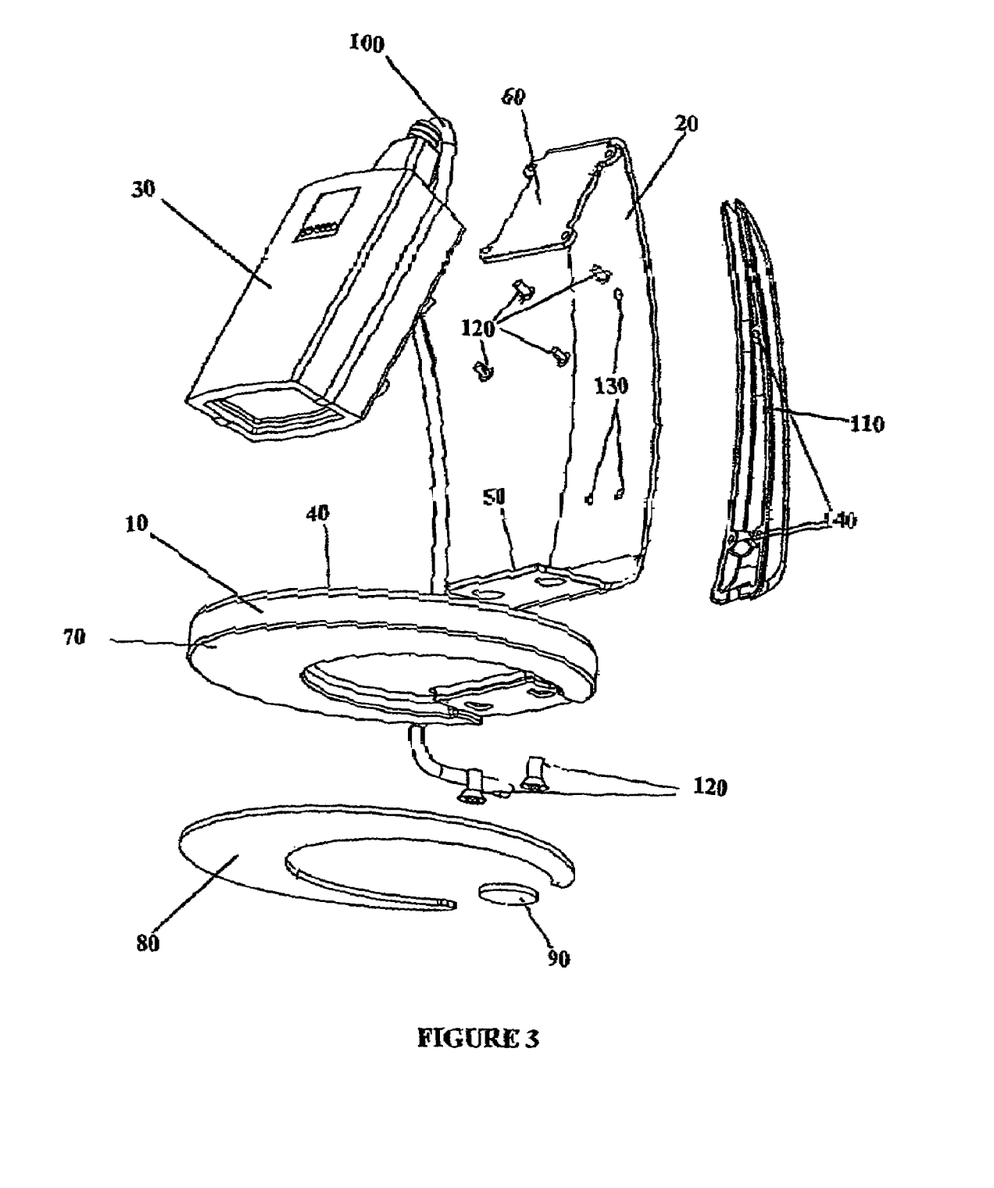
FIG. 3 is an exploded view of the stand according to one embodiment of the present invention.

In one embodiment of the present invention and with reference to FIG. 3, the base 10 has a bottom surface 70 that may be covered by one or more friction enhancement elements in order to increase the friction between the stand and the surface upon which it is placed. In one embodiment, the friction enhancement element may be made from material such as neoprene, rubber, plastic or any other material that would increase friction between the base and the surface as would be known by a worker skilled in the relevant art. In one embodiment, a first friction enhancement element 80 and second friction enhancement element 90 are applied to the bottom surface 70. In this embodiment, the second friction enhancement element 90 is provided on the bottom surface 70 due to the shape of the contact area of the bottom surface of the base with the surface. The use of a second friction element may enable the base 10 according to this embodiment, to have a relatively horizontal orientation.

Figure 6:
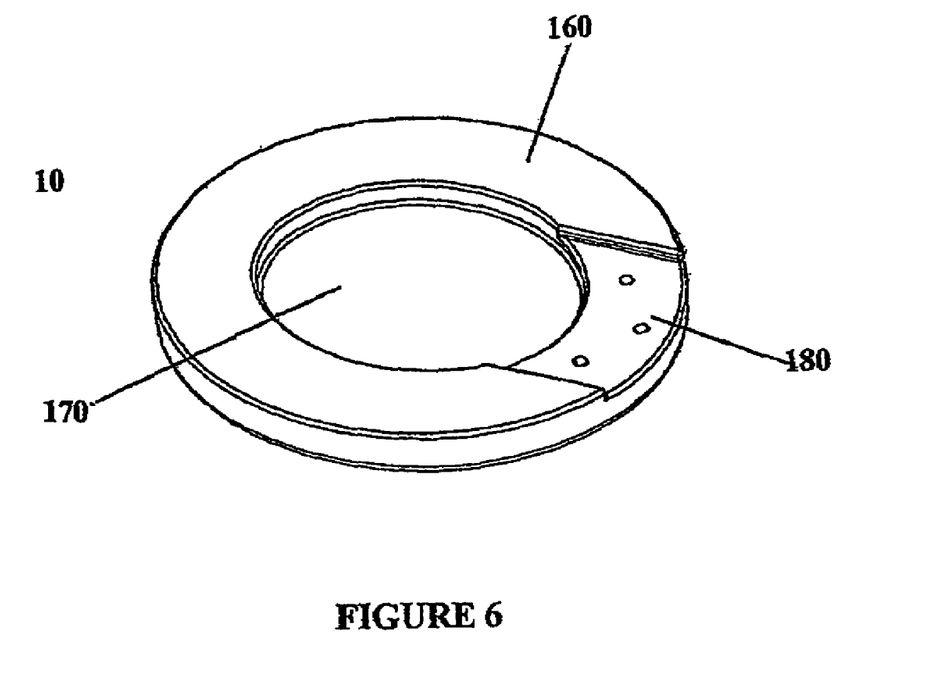
FIG. 6 is a perspective view of the base from below according one embodiment of the present invention.

In one embodiment and with reference to FIG. 6, the bottom surface 160 of the base 10 has a recessed area 170 within the internal cross section of the base. The presence of the recessed area 170 results in the weight of the base 10 being concentrated along its perimeter. In an alternate embodiment, the bottom surface of the base 10 can be uniform in thickness.

In an embodiment of the present invention, the stability of the bar code reader stand may be enhanced through the use of a weighted base. By adding weight to the base, the center of gravity of the bar code reader stand can be lowered. The weighted base may have an evenly distributed weight or may have areas of increased weight compared to other areas. An appropriate distribution of the weight in the base can provide stability to the support stand as would be understood by a worker skilled in the relevant art. In one embodiment, the weight would be distributed such that the centre of gravity of the structure, including the bar code reader, will be close to the center of the base.

In one embodiment, magnets can be integrated into the base itself. Said magnets can provide a dual function by adding weight to the appropriate portions of the base and by magnetically securing the base when it is placed on a metallic surface. The base may also contain a sheet of magnetically shielding material above the magnet in order to reduce the effect of the magnet on cards that are placed on the reading surface, if magnetic encoding together with a bar code is associated with the coded medium, for example.

According to the present invention the shape of the base provides a desired degree of stability to the bar code reader stand. In one embodiment of the present invention, such base can be oval, circular, rectangular, triangular or of any other shape as would be known by a worker skilled in the relevant art. In one embodiment, a circular or oval base provides additional stability, such that if the support stand is bumped with sufficient force to be tilted, the force may be converted into a smooth rotating motion that may diminish smoothly as opposed to a more abrupt oscillation that would occur for example, if the sides of the base are angular.

The base may be made from a plurality of materials, such as, for example, steel, aluminium, plastic, polymer, fibreglass or any other material as would be known by a worker skilled in the relevant art.

Elongated Member

In one embodiment of the present invention and with reference to FIG. 3 the elongated member 20 has a substantially flattened shape and is oriented such that a flat side faces the base 10 for interconnection thereto. The elongated member has angled portions near each end to provide two securing areas 60 and 50. The first securing area may be provided by a flat segment that is directed either forward or backward, wherein the elongated member can be interconnected with the bottom of the base, the top of the base, or the side of the base depending on the desired visual effect. The second securing area may be provided by a flat segment that is directed either towards or away from the reading surface. The main segment of the elongated member, which is between the two securing area, may be straight, curved or any other geometric design. The elongated member can optionally be curved in two directions, for example a three dimensional plane along the length and width of the elongated member. In an alternate embodiment, the elongated member is made of a tubular type of material.

The material used for the elongated member 20 may be steel, plastic, hardened resin or any other material as would be known by a worker skilled in the relevant art. The material chosen must enable the elongated member to have the required properties to support the weight of a given bar code reader fixed to the elongated member.

Cable Cover

In one embodiment and with further reference to FIG. 3, the elongated member 20 has a first end 50 which can be fixed to the base 10 and has a second end 60 at which a bar code reader 30 may be installed. A scanner cable 100 is connected to the bar code reader 30 and extends along the length of the elongated member 20. A cable cover 110 may also be positioned on either the front or back surface of the elongated member 20 depending on the location of the scanner cable 100. The cable cover 110 may also act as a retaining means for the scanner cable 100 connected to the bar code reader 30 and/or may also hide the scanner cable from view. The cable cover can also prevent accidental tension being applied to the scanner cable 100 by movement of the bar code reader stand or pulling of the cable, for example. This feature can provide a degree of protection to the interconnection point between the cable and the bar code reader. The cable cover may have integrated therein one or more soft pads of rubber, neoprene or other suitable material, to hold the cable in place and prevent sliding or abrasion, thereby reducing damage to the cable if such accidental movements occur. These soft pads can be integrated along the length of the cable cover or may only be present at the entry and exit points of the cable with respect to the cable cover.

Reading Surface

Figure 5:
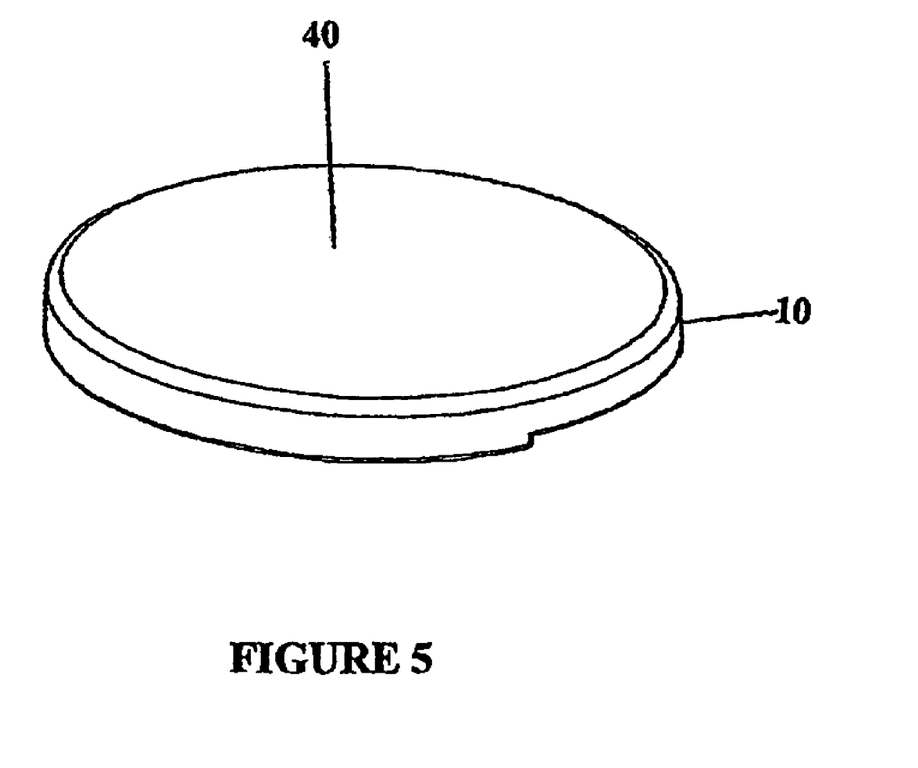
FIG. 5 is a perspective view of the base from above according to one embodiment of the present invention.

In one embodiment and with reference to FIG. 5, the base 10 incorporates a reading surface 40. A coded medium is positioned on the reading surface 40 to enable scanning thereof by a bar code reader (not shown) connected to the elongated member. In one embodiment of the present invention, the reading surface may comprise slight indentations and/or protrusions in order to guide the user during positioning of the coded medium on the reading surface. In another embodiment of the present invention, the reading surface may present visual indications, such as a square or rectangle, to indicate suitable placement of the coded medium. The top surface 40 of the base may also be used to present marketing material wherein promotional or marketing material may be printed onto a covering material and this covering material may be fixed permanently or temporarily on the top surface 40 of the base. The covering may be fixed to the top surface 40 of the base by means of flanges, grooves, clips, velcro, glue or other means known in the art.

Securing Areas

Figure 2:
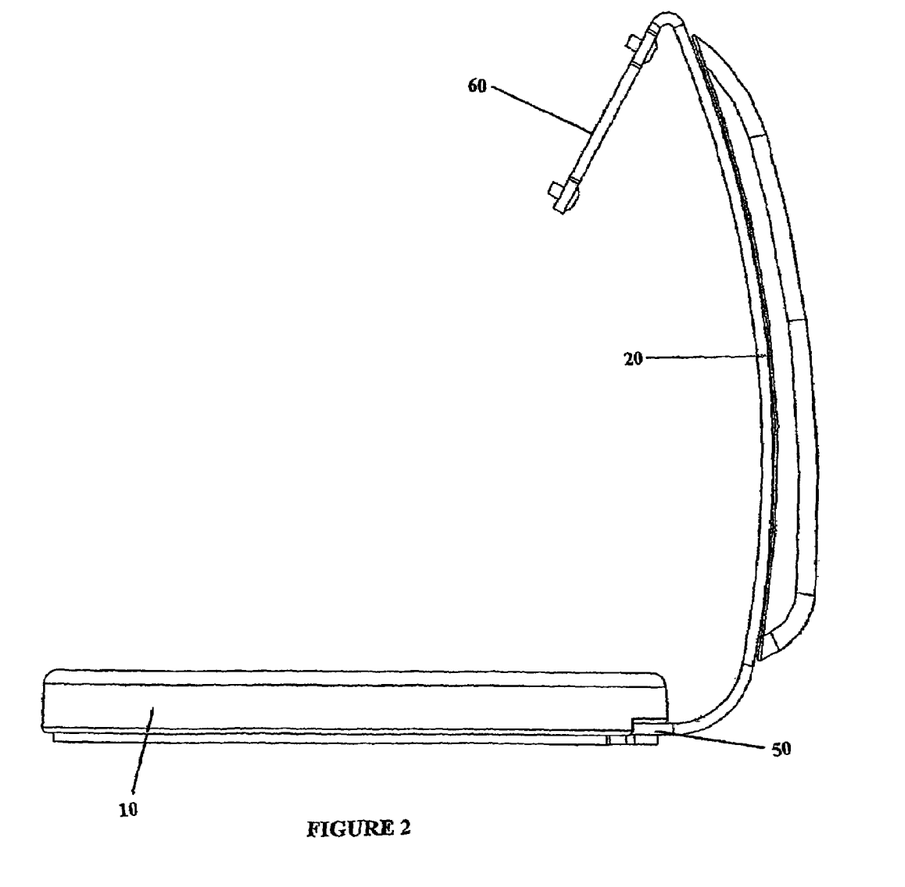
FIG. 2 is a side view of the stand according to one embodiment of the present invention.

In one embodiment and with further reference to FIG. 6, the base 10 has a securing area 180 to which the elongated member can be attached. Various securing means may be used for example, screws, nuts and bolts or any other securing means as would be known by a worker skilled in the relevant art. The securing area 180 may be positioned at any area along the edge of the base 10 and may either be on the bottom surface 170 or top surface of the base 10. If the securing area is on the top surface of the base, this securing area may be recessed. The depth of the recess may be equal to the thickness of the elongated member's securing area such that, when said elongated member is attached to the securing area, a flat surface is created on which the coded medium may slide. The securing area 180 may also be recessed within the bottom surface of the base. By recessing the securing area 180 within the bottom surface 170, the base can have relatively even surface and therefore may be more stable when placed on a flat surface, in addition to potentially being more aesthetically pleasing. FIG. 2 illustrates one embodiment of the present invention, wherein the first end 50 of the elongated member 20 is fixed to the bottom surface of the base 10. The second end 60 of the elongated member 20 extends away from the base 10 in an arced manner.

Figure 7:
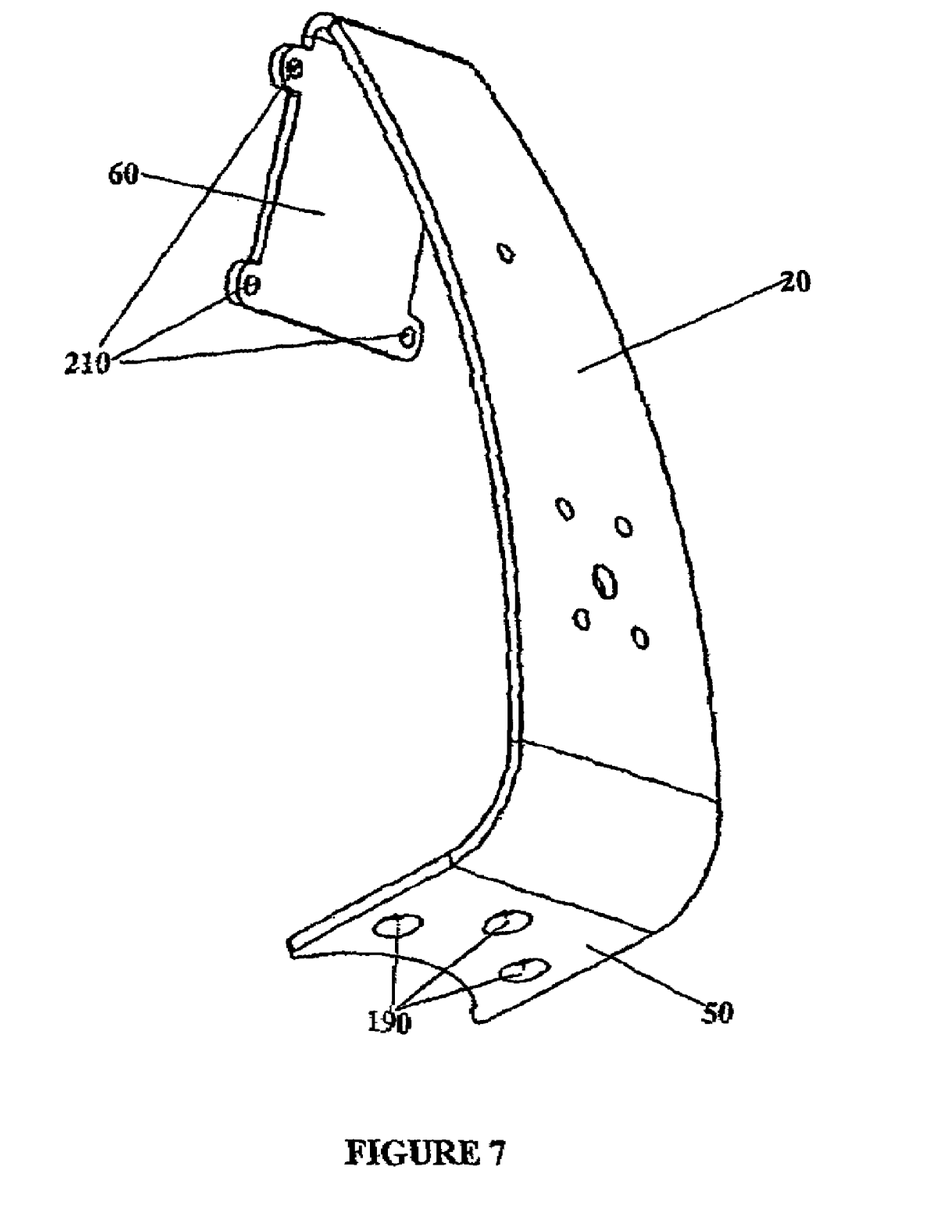
FIG. 7 is a perspective view of the elongated member according to one embodiment of the present invention.

In one embodiment and with reference to FIG. 7, the elongated member 20 has a first securing area at one end 50 such that the first securing area 50 is designed to be attached to the base. The first end 50 comprises bores 190 that enable the insertion of securing means to connect the elongated member 20 to the base. In one embodiment, these bores may be tapered thereby providing a recess for receiving the heads of the screws and additionally providing an even base surface together with a potentially more aesthetically pleasing appearance. The opposite end of the elongated member provides a second securing area 60 for attaching the bar code reader. The second securing area is oriented such that the bar code reader is oriented at a desired angle and distance with respect to the reading surface.

Securing Means

In one embodiment and with further reference to FIG. 3, securing means 120 are used to secure the elongated member 20 to the base 10, the bar code reader 30 to the elongated member 20 and the cable cover 110 to the elongated member 20. These securing means may be screws, bolts, rivets or any other means as would be known to a worker skilled in the art. Optionally, the interconnection between several of these elements can be of a permanent nature, for example, by making use of welding. However, the interconnection between the cable cover and the bar code reader with the elongated member would be of a temporary nature in order to allow for change of the bar code reader and/or the cable for example. The interconnection of the cable cover 110 and the elongated member, in addition to that of the vertical member and the base, may be provided by threaded bores into which screws or bolts are secured, for example. These threaded bores can be provided in the elongated member for securing the cable cover. Similarly, threaded bores can be provided on the top or bottom surface of the base for securing the elongated member.

In one embodiment and with further reference to FIG. 7, the second end 60 of the elongated member 20 has predrilled bores 210 which enables the insertion of securing means to secure a bar code reader (not shown) to said second end 60 of the vertical member 20. These bores can be tapered for receiving the heads of the securing means, for example, screws or bolts. Additionally, these bores may vary in number and location thereby enabling a variety of bar code readers to be connected to the bar code reader stand of the present invention. In yet another embodiment, the bar code reader is attached to the second securing area by means of interlocking grooves and flanges such that the bar code reader can be slid or snapped into place without the use of screws or bolts.

Position and Orientation of the Bar Code Reader

Figure 4:
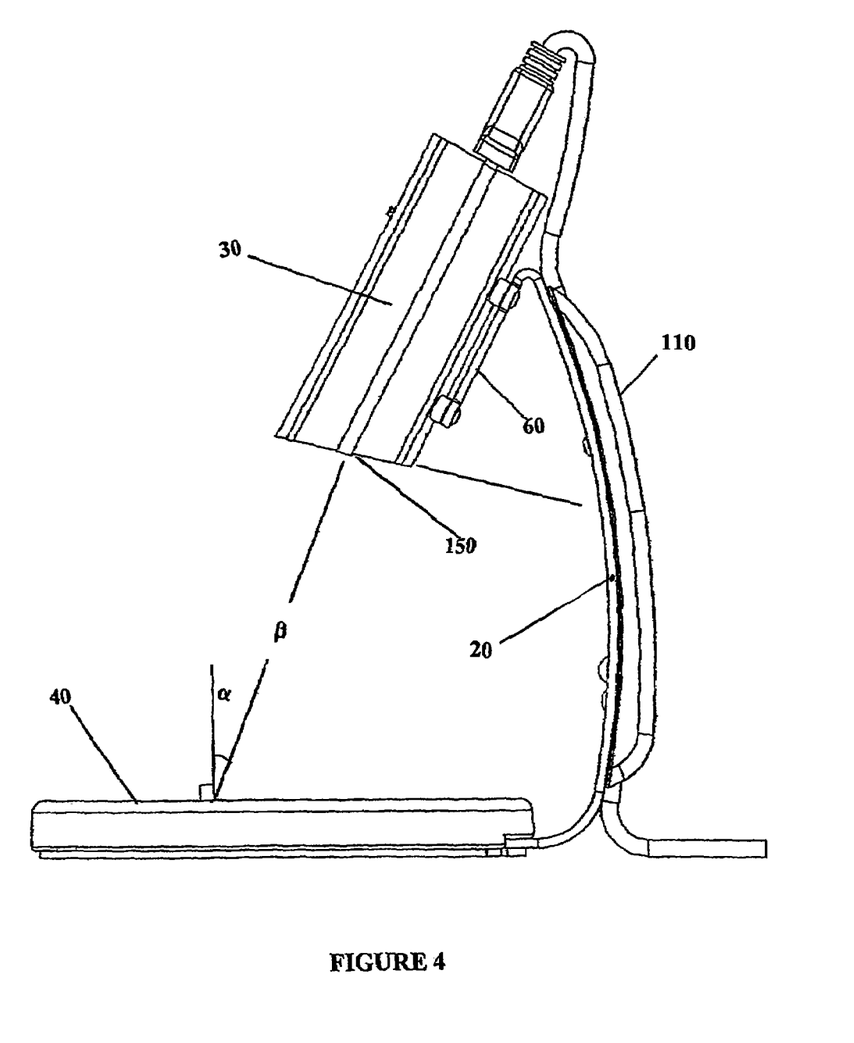
FIG. 4 is a side view of the stand with a bar code reader attached thereto, according to one embodiment of the present invention.

In one embodiment of the present invention and with reference to FIG. 4, the bar code reader 30 is attached to the second end 60 of the elongated member 20. The scanning end 150 of the bar code reader 30 is positioned in a manner that an optimal scanning angle can be established with the reading surface 40. Specifically, the scanning end 150 of the bar code reader is positioned to provide an angle of incidence defined as $\forall$ ($\alpha$) with respect to the reading surface 40, said angle being measured between the beam of light projected by the bar code reader and the normal of the reading surface. The scanning end of the bar code reader is also positioned a distance $\exists$ ($\beta$) from the reading surface 40. In one embodiment, it has been found that optimal readings of bar codes on coded mediums positioned on the reading surface are achieved when the angle $\forall$ ($\alpha$) and the distance $\exists$ ($\beta$) are 28 degrees and 5 inches, respectively. It would be appreciated that this angle and distance can vary depending on the specific use of the bar code reader stand of the present invention, for example the angle $\forall$ ($\alpha$) may be between 5 and 45 degrees and the distance $\exists$ ($\beta$) may be between 1 and 15 inches. An optimal position and angle have been established in order to enable the bar code reader to obtain a reliable reading of bar codes on a coded medium positioned on the reading surface, wherein an angle between 17 and 30 degrees and a reading distance of 1 to 15 inches have been found to provide suitably reliable readings. These criteria are affected by factors such as the shape and optical properties of the coded medium.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bar code reader stand comprising
   a) a base with a bottom surface and a top surface and a thickness, said base having a base securing area;
   b) an elongated member having a first and second end, the first end having a first securing area connected to said base at the base securing area, said elongated member extending away from said base and said second end having a second securing area for attaching a bar code reader; and
   c) a reading area including a substantially flat area on the top surface of the base; wherein the second securing area is oriented such that said bar code reader, once attached thereto, is held at a predetermined and fixed distance and angle with respect to said reading surface for reading a coded medium.

2. The stand according to claim 1 further comprising a cable cover interconnected to the elongated member for covering and holding a cable in a desired location, said cable connected to the bar code reader.

3. The stand according to claim 2 wherein said cable cover includes a soft pad for providing protection to said cable.

4. The stand according to claim 1 wherein the second securing area of said elongated member is oriented in such a way that the bar code reader, once attached thereto, is held at a reading distance in the range of 1 to 15 inches from said reading surface and a beam from the bar code reader is directed at the reading surface at a reading angle of between 17 and 30 degrees from normal to the reading surface.

5. The stand according to claim 4 wherein said reading angle is 28 degrees from normal and said reading distance is 5 inches.

6. The stand according to claim 1 wherein the base has a shape selected from circular, elliptical and substantially oval shape.

7. The stand according to claim 1 wherein the base is weighted.

8. The stand according to claim 1 having a bar code reader attached thereto, has a center of gravity located within the thickness of the base.

9. The stand according to claim 1 wherein the elongated member is attached to the bottom surface of the base.

10. The stand according to claim 1 wherein the bottom surface of the base has one or more friction enhancement elements attached thereto.

11. The stand according to claim 10 wherein the friction enhancement members are fabricated from material including neoprene, rubber or plastic.

12. The stand according to claim 1 wherein the base includes one or more magnets.

13. The stand according to claim 12 wherein the reading surface is shielded from said one or more magnets by a layer of magnetic shielding material.

14. The stand according to claim 1 wherein the securing means at the first securing area is selected from screws, bolts or rivets.

15. The stand according to claim 1 wherein the securing means at the second securing area is selected from screws, bolts or rivets.

16. The stand according to claim 1 wherein the securing means at the second securing area comprises a pair of shapes with complementary grooves and flanges whereby one side can be slid into the other, such that the second securing area and the bar code reader can interlock.

17. The stand according to claim 1 wherein the top surface of the base is used to present marketing information.

18. The stand according to claim 1 wherein the coded medium is a substantially flat object with at least one surface on which a bar code is displayed.

19. The stand according to claim 18 wherein the coded medium is a flat piece of paper or plastic on which there is a bar code.

20. The stand according to claim 18 wherein the coded medium has a promotional shape.

* * * * *